(12) United States Patent
McReynolds et al.

(10) Patent No.: US 8,882,572 B2
(45) Date of Patent: Nov. 11, 2014

(54) VENT TILE WITH AN INTEGRATED THERMAL IMAGING SENSOR AND CONTROLLER

(75) Inventors: Alan A. McReynolds, Los Altos, CA (US); Geoff M. Lyon, Menlo Park, CA (US); Abdlmonem Beitelmal, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1557 days.

(21) Appl. No.: 12/480,429

(22) Filed: Jun. 8, 2009

(65) Prior Publication Data

US 2010/0311317 A1 Dec. 9, 2010

(51) Int. Cl.
*F24F 13/10* (2006.01)
*F24F 11/053* (2006.01)
*G05D 23/20* (2006.01)
*G05D 23/27* (2006.01)

(52) U.S. Cl.
CPC ......... *G05D 23/2716* (2013.01); *F24F 2221/40* (2013.01)
USPC ........... 454/256; 454/290; 454/331; 454/185; 454/186; 165/53; 137/343

(58) Field of Classification Search
CPC .................. F24F 2221/40; G05D 23/2716
USPC .............. 454/256, 186, 185; 165/53; 137/343
See application file for complete search history.

(56) References Cited

U.S. PATENT DOCUMENTS

| | | | | |
|---|---|---|---|---|
| 4,672,206 A * | 6/1987 | Suzuki et al. | ................ | 250/342 |
| 5,623,259 A * | 4/1997 | Giangardella | ............. | 340/932.2 |
| 6,574,104 B2 * | 6/2003 | Patel et al. | .................... | 361/695 |
| 6,659,359 B2 * | 12/2003 | Kwak | .......................... | 236/49.3 |
| 6,881,142 B1 * | 4/2005 | Nair | .............................. | 454/186 |
| 6,945,058 B2 * | 9/2005 | Bash et al. | ........................ | 62/89 |
| 6,981,915 B2 * | 1/2006 | Moore et al. | .................... | 454/184 |
| 7,000,480 B2 * | 2/2006 | Kramer | ........................... | 73/714 |
| 7,013,968 B2 * | 3/2006 | Beitelmal et al. | ............. | 165/244 |
| 7,171,328 B1 * | 1/2007 | Walker et al. | ................. | 702/136 |
| 7,251,547 B2 * | 7/2007 | Bash et al. | ..................... | 700/276 |
| 7,320,638 B2 * | 1/2008 | Craig | ............................ | 454/290 |
| 7,347,058 B2 * | 3/2008 | Malone et al. | ............... | 62/259.2 |
| 7,463,950 B1 * | 12/2008 | Brey et al. | ..................... | 700/299 |
| 7,640,760 B2 * | 1/2010 | Bash et al. | ....................... | 62/178 |
| 7,739,073 B2 * | 6/2010 | Hamann et al. | ............... | 702/130 |
| 7,856,495 B2 * | 12/2010 | Chainer et al. | ................ | 709/223 |
| 8,180,494 B2 * | 5/2012 | Dawson et al. | .............. | 700/278 |
| 2004/0176022 A1 * | 9/2004 | Thrasher et al. | .............. | 454/256 |
| 2005/0182523 A1 * | 8/2005 | Nair | .............................. | 700/276 |
| 2005/0208888 A1 | 9/2005 | Moore et al. | | |
| 2005/0266792 A1 * | 12/2005 | Rimmer et al. | ............... | 454/290 |
| 2006/0075764 A1 | 4/2006 | Bash et al. | | |
| 2006/0086119 A1 | 4/2006 | Malone et al. | | |
| 2007/0125107 A1 | 6/2007 | Beam | | |
| 2008/0009237 A1 * | 1/2008 | Wu | ................................ | 454/256 |
| 2008/0119127 A1 * | 5/2008 | Stewart | ......................... | 454/256 |
| 2008/0277486 A1 * | 11/2008 | Seem et al. | ................... | 236/49.3 |
| 2009/0134333 A1 * | 5/2009 | Ishibashi et al. | .............. | 250/352 |
| 2009/0293518 A1 * | 12/2009 | Bettella | ........................... | 62/186 |
| 2010/0029193 A1 * | 2/2010 | Ahladas et al. | ............... | 454/184 |
| 2012/0078422 A1 * | 3/2012 | Mejias et al. | ................. | 700/277 |

* cited by examiner

*Primary Examiner* — Steven B McAllister
*Assistant Examiner* — Frances H Kamps

(57) ABSTRACT

A vent tile includes at least one louver, an actuator configured to control the at least one louver, a thermal imaging sensor configured to monitor temperature of a remotely located apparatus through thermal imaging of a surface of the apparatus, and a controller configured to control the actuator based upon the monitored temperature.

13 Claims, 6 Drawing Sheets

VENT TILE WITH AN INTEGRATED THERMAL IMAGING SENSOR AND CONTROLLER

BACKGROUND

A data center may be defined as a location, for instance, a room, that houses computer systems arranged in a number of racks. Standard racks may be configured to house a number of computer systems, for instance, about forty (40) to eighty (80) systems. The computer systems typically include a number of components, such as, one or more of printed circuit boards (PCBs), mass storage devices, power supplies, processors, micro-controllers, semi-conductor devices, and the like, that may dissipate relatively significant amounts of heat during the operation of the respective components. For example, a typical computer system comprising multiple microprocessors may dissipate approximately 250 W of power. Thus, a rack containing forty (40) computer systems of this type dissipates approximately 10 KW of power.

Computer rooms are known to be built with raised floors. The under floor volume is pressurized with a cooling fluid, often chilled air. Where cooling is needed, the cooling fluid blows upwards through vented floor tiles. These vented floor tiles are often mechanically constructed devices, which contain fixed venting (covering a known percentage of their surface area) or are designed with adjustable louvers or sliding apertures to allow more or less of the cooling fluid to flow through the tile. The cooling fluid flows upwards through the vented floor tiles towards the hot computer systems and is circulated throughout the computer systems, causing a cooling effect.

The need for the cooling fluid varies in the short term as load gets passed around the room and in the long term as more computer systems are added to the room or racks are vacated. As such, some types of vented floor tiles are known to incorporate servo mechanisms to adjust louvers contained therein, under computer control, to the desired angle in order to vary the volume flow rate of the cooling fluid. These types of vented floor tiles are often controlled based upon data collected by sensing grids, which typically determine the required volume flow rate of the cooling fluid by monitoring the temperature of computer systems within the room. However, current sensing grids require extensive cabling within the room and underneath the floor. Additionally, the sensing grids are often extremely sensitive because of the relatively high potential for the extensive cabling to fail.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures are not described in detail so as not to unnecessarily obscure the description of the embodiments.

Disclosed herein is a vent tile including a casing, at least one louver positioned within the casing, an actuator configured to control the at least one louver, a thermal imaging sensor configured to detect a temperature of one or more zones of a surface of a remotely located apparatus through thermal imaging of the surface, and a controller configured to control the actuator based upon the monitored temperature. The controller, actuator, and thermal imaging sensor are integrated into the vent tile and thus, the vent tile may be placed as a vented floor tile in a data center and operate independently from other control systems. In other words, the vent tile disclosed herein is not required to receive temperature information from an outside source, such as a wired or wireless, externally located sensor grid.

The vent tile disclosed herein may be employed as a self contained application for dynamically controlling the volume flow rate of a fluid in a room containing computer systems. In addition, the vent tile disclosed herein is less prone to failure as compared with conventional vent tiles that receive environmental condition data from sensor grids or other external sensing devices because there is no need for communications between the sensor grids or the other external sensing devices.

The term "fluid," as used herein, refers to gases. As such, the vent tile may be operated to control the flow of, for instance, airflow, or other cooling gases, supplied to computer systems and/or cooling systems housed in a data center. The vent tile may control the flow of the fluid through operation of louvers or, equivalently, dampers, which are movable components of the vent tile designed to physically vary the flow of fluid through the vent tile. The louvers (or dampers) may take a variety of forms and include, for example, a series of elongated blades, sliding components, folding components, etc., any of which may be used in conjunction with the vent tile described herein.

The actuator that manipulates the position and or rotation of the louvers may be controlled by one or more controllers. The controllers each comprises electronic circuitry for controlling the actuators and communicating with other devices. For example, the controllers may receive signals from, and transmit signals to, one or more other controllers and/or a central controller, as described in greater detail below.

Figure 1:
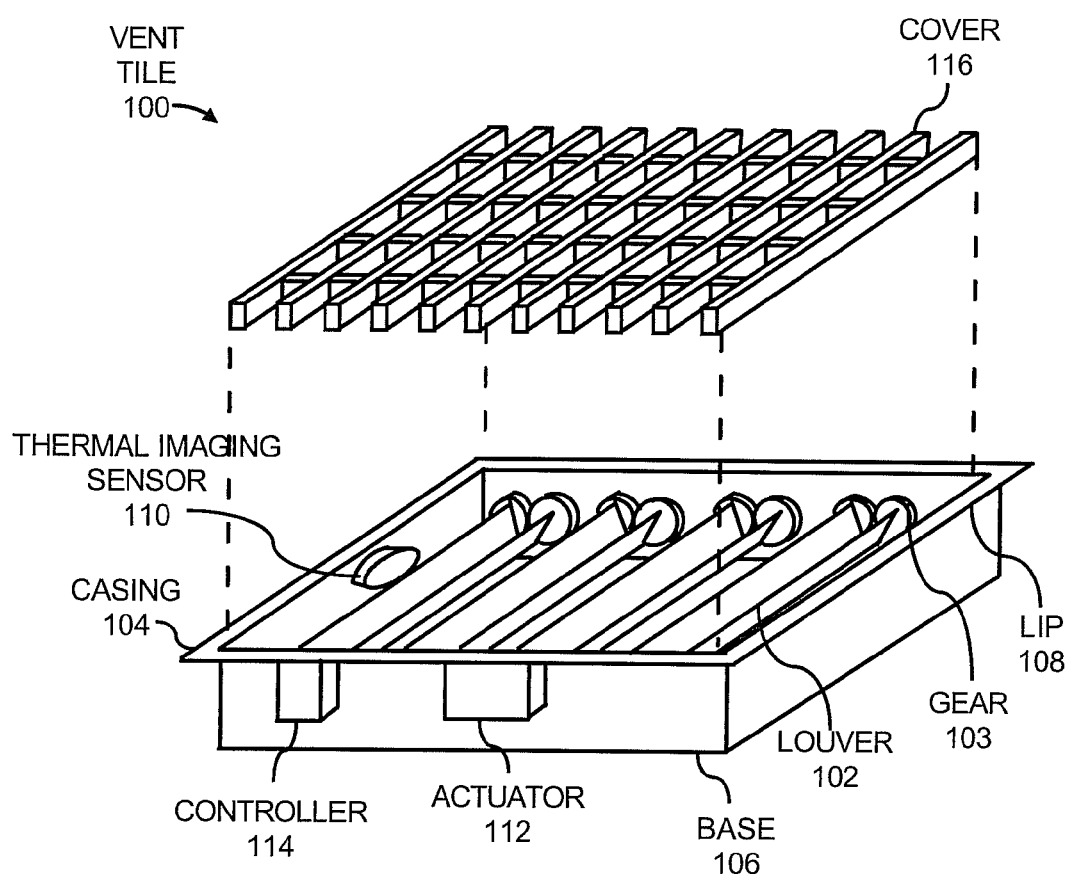
FIG. 1 illustrates a perspective view of a vent tile, according to an embodiment of the invention.

With reference first to FIG. 1, there is shown a perspective view of a vent tile 100, according to an example. It should be understood that the following description of the vent tile 100 is but one manner of a variety of different manners in which such a vent tile 100 may be configured. In addition, it should be understood that the vent tile 100 may include additional components and that some of the components described herein may be removed and/or modified without departing from a scope of the vent tile 100.

As depicted in FIG. 1, the vent tile 100 includes louvers 102 attached to respective gears 103, a casing 104, a thermal imaging sensor 110, an actuator 112, a controller 114, and a cover. The casing 104 is depicted as including a base 106 and a lip 108. The base 106 generally provides strength and rigidity to the vent tile 100 and the lip 108 substantially maintains the vent tile 100 in position with respect, for instance, to an opening in a raised floor. In addition, the vent tile 100 may be sized to replace conventional floor tiles or vented floor tiles often employed in data centers. The cover 116 is depicted as being formed of a grated structure having a plurality of openings through which fluid may readily pass. The cover 116 generally protects the louvers 102 and other components contained in the vent tile 100 as personnel walk over the vent tile 100. In addition, although the cover 116 has been depicted as forming a separate component from the casing 104 of the vent tile 100, it should be understood that the cover 116 may be integrated with the casing 104 without departing from a scope of the vent tile 100.

One or more of the louvers 102 are movably connected to the base 106. Thus, for instance, one or more of the louvers 102 are rotatable with respect to the base 106. Although not explicitly shown, the actuator 112 is configured to vary the position of one or more of the louvers 102 through any of a variety of known manners. In addition, although not explicitly shown, the gears 103 may include teeth or cogs configured to mesh with neighboring gears 103. By way of particular example, the actuator 112 may be connected to one or more gears 103, which are in contact with one or more adjacent gears 103, such that, rotation of the gear 103 connected to the actuator 112 causes the remaining gears 103 to rotate. In this regard, the actuator 112 may comprise a one-way or a two-way motor that is mechanically connected to one or more of the louvers 102. In addition, although the vent tile 100 has been depicted with multiple louvers 102, it should be understood that the vent tile 100 may include a single louver 102 without departing from a scope of the vent tile 100.

The controller 114 is configured to control the actuator 112 based upon temperature data collected by the thermal imaging sensor 110. In this regard, the controller 114 may comprise a microprocessor, an ASIC, a microcontroller, etc., configured to receive input from the thermal imaging sensor 110 and to output control signals or instructions to the actuator 112.

The thermal imaging sensor 110 is generally configured to detect the temperature of a remotely located surface through capture and analysis of an infrared image of the surface. The thermal imaging sensor 110 may operate in any of a variety of known manners to determine the temperature at one or more points on the remotely located surface. In addition, the vent tile 100 is configured to be positioned in proximity to a remotely located apparatus as described with respect to FIG. 2 below. Thus, for instance, the vent tile is configured to control the supply of fluid flow to the remotely located apparatus.

Although the actuator 112 and the controller 114 are shown as being located on the exterior of the casing 106, it should be understood that the actuator 112 and the controller 114 may be located within the casing 106. In addition, although not shown, the vent tile 100 may be equipped to receive electrical power through at least one electrical connection an AC source. Moreover, or alternatively, the vent tile 100 may be equipped with a battery compartment for receipt of DC power from one or more batteries.

Figure 2:
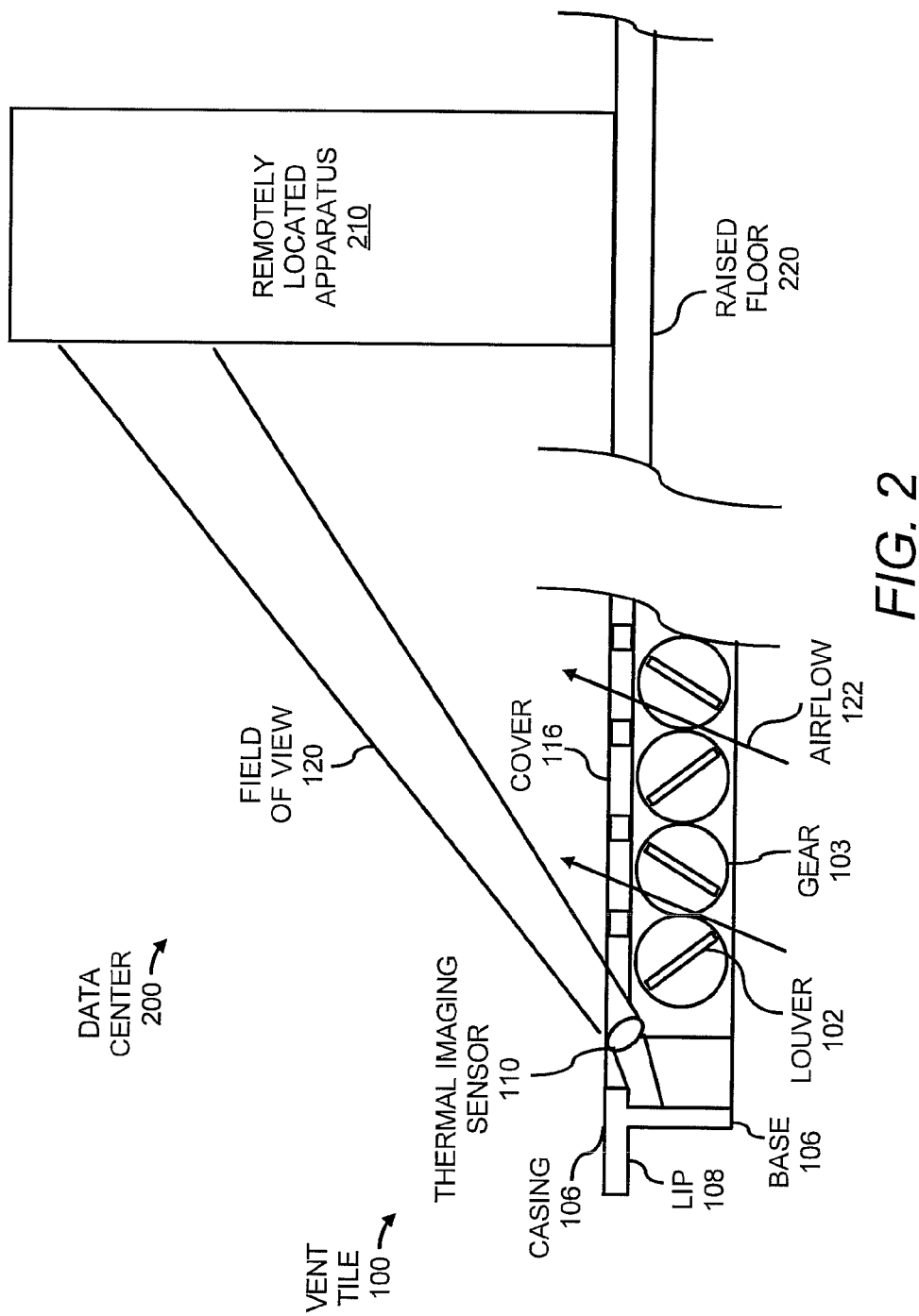
FIG. 2 illustrates a cross-sectional side view of a section of a data center containing the vent tile depicted in FIG. 1, according to an embodiment of the invention.

With reference now to FIG. 2, there is shown a cross-sectional side view of a section of a data center 200 containing the vent tile 100 depicted in FIG. 1, according to an example. It should be understood that the following description of the data center 200 is but one manner of a variety of different manners in which such a data center 200 may be configured. In addition, it should be understood that the data center 200 may include additional components and that some of the components described herein may be removed and/or modified without departing from a scope of the data center 200.

As depicted in FIG. 2, the data center 200 includes a raised floor 220 with an under floor volume that is pressurized with a fluid, often chilled air. The vent tile 100 is depicted is being positioned within an opening in the raised floor 220 to thereby control the flow of fluid from beneath the raised floor 220. Although the vent tile 100 has been depicted as being positioned on a raised floor 220, the vent tile 100 may also be positioned on a lowered ceiling or a wall of the data center 200 without departing from a scope of the vent tile 100 disclosed herein.

Also depicted in FIG. 2 is a remotely located apparatus 210, which is remotely located with respect to the vent tile 100. The remotely located apparatus 210 may comprise, for instance, an electronics cabinet or rack, a computer, a server, a hard drive, or other structure to be cooled with the fluid. In any regard, a surface 212 of the remotely located apparatus 210 is positioned within a field of view 120 of the thermal imaging sensor 110. The surface 212 may thus comprise, for instance, a door or cover of an electronics cabinet or rack, an outer casing of a server, computer, or hard drive, etc. In operation, and as described in greater detail herein below, the vent tile 100 is configured to control the flow of fluid supplied to the remotely located apparatus 210 based upon one or more temperatures detected at the surface 212 of the remotely located apparatus 210.

The field of view 120 of the thermal imaging sensor 110 may be varied for instance through manipulation of one or more aspects of the thermal imaging sensor 110. For instance, the thermal imaging sensor 110 may be rotatably mounted in one or more dimensions with respect to the casing 104 to thereby enable the position of the field of view 120 to be varied in one or more directions. In addition, or alternatively, the coverage area of the field of view 120 may be varied. Thus, for instance, the thermal imaging sensor 110 may be configured to detect the temperature of a single pixel-sized location on the surface 212 up to the entire surface area of the surface 212. The thermal imaging sensor 110 may be configured to detect the temperature of a multi-pixel grid area of the surface 212. By way of particular example, the thermal imaging sensor 110 is configured to detect the temperature of an 8 pixel by 8 pixel grid area of the surface 212. In this example, some or all of the pixels may have different temperatures and the controller 114 may determine which of the pixels has the highest temperatures. The controller 114 may then vary the fluid flow supplied through the vent tile 100 based upon the determination.

According to an example, the thermal imaging sensor 110 may be configured to monitor specific sections of the surface of the remotely located apparatus 210. For instance, sections of the remotely located apparatus 210 in closer proximity to the raised floor 220 tend to be colder than sections further away from the raised floor 220 due to greater recirculation of the fluid away from the raised floor 220. Consequently, the thermal imaging sensor 110 may be directed at a section of the surface of the remotely located apparatus 210 further away from the raised floor 220.

The controller 114 is built into the vent tile 100 and is configured to direct the operation of the vent tile 100 in order to vary the fluid supplied to the remotely located apparatus 210. More particularly, the controller 114 is configured to operate the actuator 112 to vary the positions of one or more of the louvers 102 to thereby vary the volume flow rate of the fluid flow 122 supplied through the vent tile 100. According to an embodiment, the controller 114 is configured to maintain the temperature of the surface of the remotely located apparatus 210 below a predetermined temperature threshold. The controller 114 may, however, be programmed with more complex objectives. For instance, specifically identified equipment may be maintained below lower predetermined temperature thresholds than the temperature allowed for the overall surface of the remotely located apparatus 210.

As the fluid flow 122 flows through the vent tile 100 towards the remotely located apparatus 210, the temperature of the surface of the remotely located apparatus 210 rapidly converges towards the temperature of the fluid flow 122. Consequently, the temperature of the surface 212 of the remotely located apparatus 210 may be used as a proxy for the temperature of the fluid flow 122 at the surface 212 of the remotely located apparatus 210. This relationship between the temperature of the surface 212 of the remotely located apparatus 210 and the temperature of the fluid flow 122 holds for a variety of materials including plastics and metals.

Figure 3:
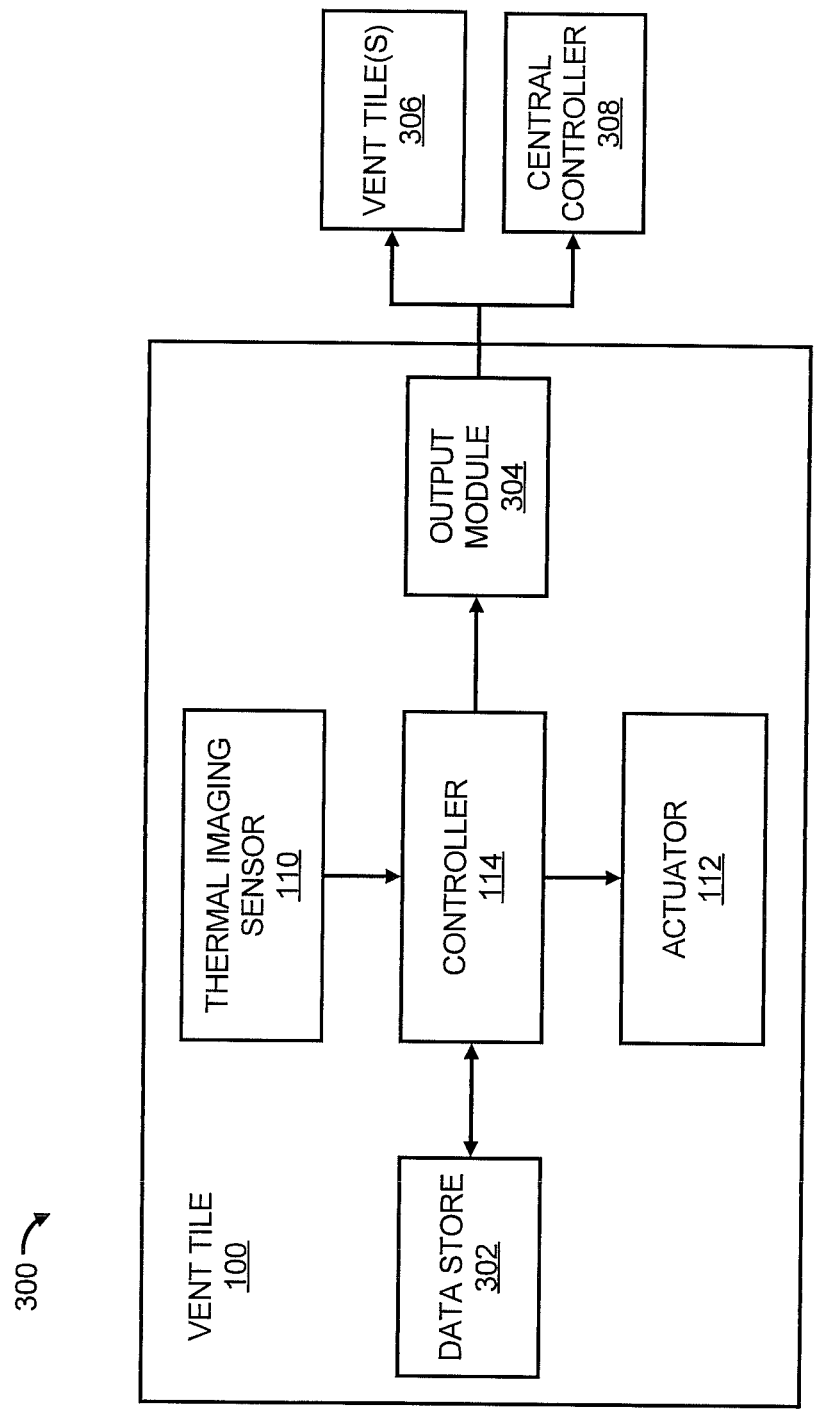
FIG. 3 illustrates a block diagram of a cooling system that employs the vent tile 100 depicted in FIGS. 1 and 2, according to an embodiment of the invention.

With reference now to FIG. 3, there is shown a block diagram of a cooling system 300 that employs the vent tile 100 depicted in FIGS. 1 and 2, according to an embodiment. It should be understood that the following description of the cooling system 300 is but one manner of a variety of different manners in which such a cooling system 300 may be configured. In addition, it should be understood that the cooling system 300 may include additional components and that some of the components described herein may be removed and/or modified without departing from a scope of the cooling system 300.

As depicted in FIG. 3, the cooling system 300 includes the vent tile 100 depicted in FIGS. 1 and 2, additional vent tile(s) 306 and a central controller 308. As such, the vent tile 100 is depicted as including an actuator 112, a thermal imaging sensor 110, and a controller 114. The vent tile 100 is also depicted as including a data store 302 and an output module 304. As shown, the controller 114 receives data, for instance, detected temperature information of the surface 212, from the thermal imaging sensor 110. In addition, the controller 114 may store the received data in the data store 302, which may comprise a volatile and/or non-volatile memory, such as DRAM, EEPROM, MRAM, flash memory, and the like. In addition, or alternatively, the data store 302 may comprise a device configured to read from and write to a removable media, such as, a floppy disk, a CD-ROM, a DVD-ROM, or other optical or magnetic media.

In any regard, the data store 302 may also store one or more programs, utilities, subprograms, etc., that define the functionality of the controller 114. One of the controller's 114 functions includes determining how to manipulate the actuator 112 based upon the data received from the thermal imaging sensor 110. Various manners in which the controller 114 operates to manipulate the actuator 112 are described in greater detail herein below.

Another one of the controller's 114 functions may include communicating information pertaining at least one of the conditions detected by the thermal imaging sensor 110 and the actuator 112 manipulations. More particularly, for instance, the controller 114 may communicate this information to the controllers of one or more other vent tiles 306 and/or to a central controller 308.

According to an example, the vent tile 100 may interact with one or more of the other vent tiles 306 in order to maintain the temperature of the data center 200 and/or sections of the data center 200 below predetermined temperature thresholds. For instance, the vent tile 100 may communicate through the output module 304 with at least one adjacent vent tile 306 to operate in a coordinated manner. Thus, for instance, the controller 114 may be programmed so that if a remotely located apparatus associated with another vent tile 306 adjacent to the vent tile 100 requires extra cooling capacity, the controller 114 may adjust one or more of the louvers 102 in the vent tile 100 in order to increase the volume flow rate of the fluid flow 122 through the vent tile 100.

The vent tile 100 may communicate with the other vent tiles 306 through the output module 304 using wireless signals, infrared signals and/or any suitable process of communicating with the other vent tiles 306. For instance, the vent tile 100 may transmit an infrared signal to the remotely located apparatus 210 that is then read by the other vent tiles 306.

The central controller 308 may be configured to control the operations of one or more air conditioning units (not shown). In one example, the central controller 308 may modify the operations of the one or more air conditioning units based upon the operations of the vent tiles 100, 306 as determined from information collected from one or more of controllers 114. Thus, for instance, the central controller 308 may modify one or both of the temperature and the volume flow rate of fluid supplied by the one or more air conditioning units to maintain the temperatures of one or more sections of the data center 200 within predetermined temperature thresholds. For instance, the controller 114 may communicate through the output module 304 to the central controller 308 that the one or more louvers 102 are open to their maximum extents and that the temperature of the surface of the remotely located apparatus 210 is above the predetermined temperature threshold. In this example, the central controller 308 may then direct one or more of the air conditioning units to decrease the temperature of the fluid flow 122. Alternately, the central controller 308 may cause one or more of the air conditioning units to increase the rate of flow of fluid flow 122 supplied to the vent tile 100.

Figure 4:
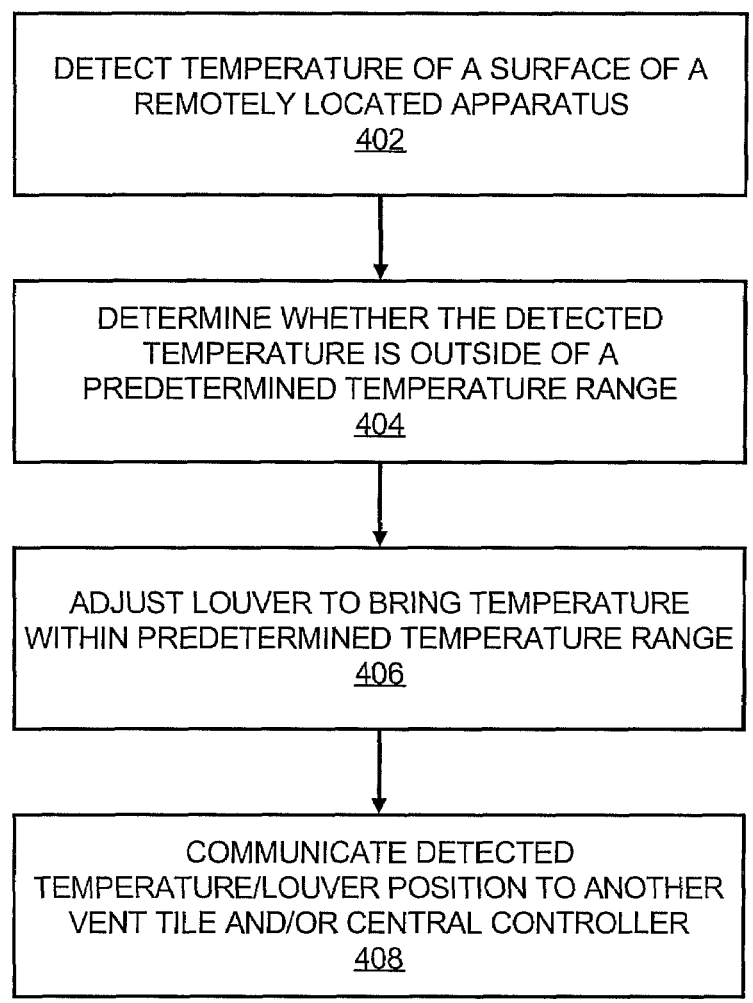
FIG. 4 illustrates a flow diagram of a method of managing fluid flow distribution with the vent tile depicted in FIGS. 1-3, according to an embodiment of the invention.

Turning now to FIG. 4, there is shown a flow diagram of a method 400 of managing fluid flow distribution with the vent tile 100 depicted in FIGS. 1-3, according to an embodiment. It should be understood that the method 400 depicted in FIG. 4 may include additional steps and that some of the steps described herein may be removed and/or modified without departing from a scope of the method 400.

At step 402, the thermal imaging sensor 110 detects the temperature of one or more locations of a surface 212 of the remotely located apparatus 210. As discussed above, the thermal imaging sensor 110 is positioned within the vent tile 100 and has a field of view 120 that encompasses at least one pixel sized area on the surface 212. In addition, the thermal imaging sensor 110 is configured to detect the temperature of the one or more locations of the surface 212 through thermal imaging of the surface 212.

At step 404, the controller 114 determines whether the detected temperature is outside of a predetermined temperature range. The predetermined temperature range may comprise a range of temperatures between a lower bound and an upper bound of temperatures that are desired for the remotely located apparatus 210. Thus, for instance, the predetermined temperature range may include a range of temperatures recommended by the apparatus 210 manufacturer. As another example, the predetermined temperature range may be a range of temperatures that is known to enable the apparatus 210 to operate efficiently.

At step 406, if the monitored temperature is outside of the predetermined temperature range, the controller 114 causes the actuator 112 to adjust the one or more of the louvers 102 to vary the volume flow rate of the fluid flow 122 supplied through the vent tile 100. For instance, if the detected temperature is above the upper bound of the predetermined temperature range, the controller 114 may cause the actuator 112 to manipulate the positions of one or more of the louvers 102 to increase the volume flow rate of the fluid flow 122. Alternately, if the detected temperature is below the lower bound of the predetermined temperature range, the controller 114 causes the actuator 112 to manipulate the positions of one or more of the louvers 102 to decrease the volume flow rate of the fluid flow 122.

According to an example, the controller 114 is configured to communicate at least one of the detected temperature and the position of the louver 102 to a controller 114 of at least one other vent tile 100, as indicated at step 408. As also depicted at step 408, the controller 114 may be configured to communicate at least one of the detected temperature and the position of the louver 102 to a central controller 308. The controller 114 may communicate the information discussed with respect to step 408 for reasons discussed above with respect to FIG. 3.

Figure 5:
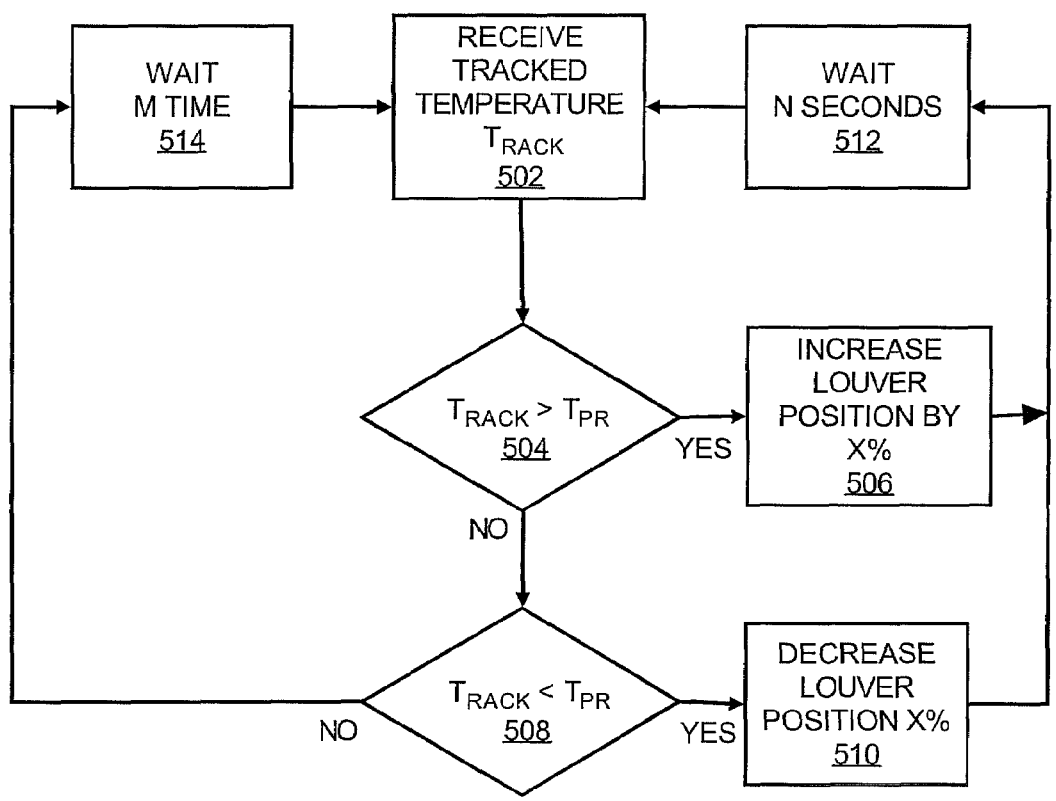
FIG. 5 illustrates a flow diagram of a method of managing fluid flow distribution with the vent tile depicted in FIGS. 1-3, in greater detail as compared with the method depicted in FIG. 4, according to an embodiment of the invention.

Turning now to FIG. 5, there is shown a flow diagram of a method 500 of managing fluid flow distribution with the vent tile 100 depicted in FIGS. 1-3, according to an example. It should be understood that the method 500 depicted in FIG. 5 may include additional steps and that some of the steps described herein may be removed and/or modified without departing from a scope of the method 500.

Generally speaking, the method 500 is similar to and contains the same steps as those discussed above with respect to the method 400 in FIG. 4. However, the method 500 provides a more detailed description of those steps. In addition, the method 500 particularly recites the remotely located apparatus 210 as an electronics cabinet or, equivalently, a rack for housing a plurality of computer systems.

At step 502, the thermal imaging sensor 110 of the vent tile 100 detects the temperature ($T_{rack}$) across a surface 212 of the remotely located apparatus 210, in this instance, a rack, through thermal imaging of the surface 212. The detected temperature ($T_{rack}$) is input into the controller 114.

At step 504, the controller 114 determines whether the detected temperature ($T_{rack}$) across the surface 212 of the rack 210 is greater than the upper bound of a predetermined temperature range ($T_{pr}$). More particularly, the controller 114 determines if one or more pixels in the thermal image captured by the thermal imaging sensor 110 exceeds the predetermined temperature range ($T_{pr}$). If the controller 114 determines that the detected temperature ($T_{rack}$) exceeds the predetermined temperature range ($T_{pr}$), the controller 114 directs the actuator 112 to modify the position of one or more of the louvers 102 to increase the fluid flow 122 through the vent tile 100 by a predetermined amount, such as, by an X %, as indicated at step 506. The predetermined amount may be variable and comprises a value between 1-100, where 1 is nearly fully closed and 100 is nearly fully open.

If, however, the controller 114 determines that the detected temperature ($T_{rack}$) does not exceed the predetermined temperature range ($T_{pr}$), the controller 114 may determine whether the detected temperature ($T_{rack}$) falls below the predetermined temperature range ($T_{pr}$), as indicated at step 508.

If the controller 114 determines that the detected temperature ($T_{rack}$) does not fall below the predetermined temperature range ($T_{pr}$), the controller 114 may wait for a period of time (M) prior to receiving another detected temperature measurement from the thermal imaging sensor 110, as indicated at step 514. The period of time (M) may be based upon any number of factors and may thus be equivalent to a few seconds, a few minutes, one or more hours, etc.

If, however, the controller 114 determines that the detected temperature ($T_{rack}$) falls below a lower bound of the predetermined temperature range ($T_{pr}$), the controller 114 directs the actuator 112 to modify the position of one or more of the louvers 102 to decrease the fluid flow 122 through the vent tile 100 by a predetermined amount, such as, by an X %, as indicated at step 510. The fluid flow 122 supplied through the vent tile 100 may be reduced when the detected temperature ($T_{rack}$) falls below a lower bound to thereby reduce the amount of energy consumed by a cooling system in cooling the rack 210.

Following either of steps 506 and 510, the controller 114 then waits N seconds as indicated at step 512 prior to receiving another detected temperature measurement from the thermal imaging sensor 110. The wait time of N seconds may be selected in order to provide sufficient time for the changed position of the one or more louvers 102 to have an effect on the temperature of the surface 212 of the rack 210.

The controller 114 may repeat the method 500 for any duration of time or for any number of iterations. For instance, the controller 114 may perform the method 500 on a substantially continuous basis when the rack 210 contains operating components.

Additionally, although not shown, the controller 114 may communicate at least one of the detected temperature ($T_{rack}$) and the position of the at least one louver to the controller(s) 114 of one or more other vent tile(s) 306. Further, the controller 114 may communicate this information to the central controller 308, as discussed above.

Some or all of the operations set forth in the methods 400 and 500 may be contained as one or more utilities, programs, or subprograms, in any desired computer accessible or readable medium. In addition, the methods 400 and 500 may be embodied by a computer program, which may exist in a variety of forms both active and inactive. For example, it can exist as software program(s) comprised of program instructions in source code, object code, executable code or other formats. Any of the above can be embodied on a computer readable medium.

Exemplary computer readable storage devices include conventional computer system RAM, ROM, EPROM, EEPROM, and magnetic or optical disks or tapes. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 6:
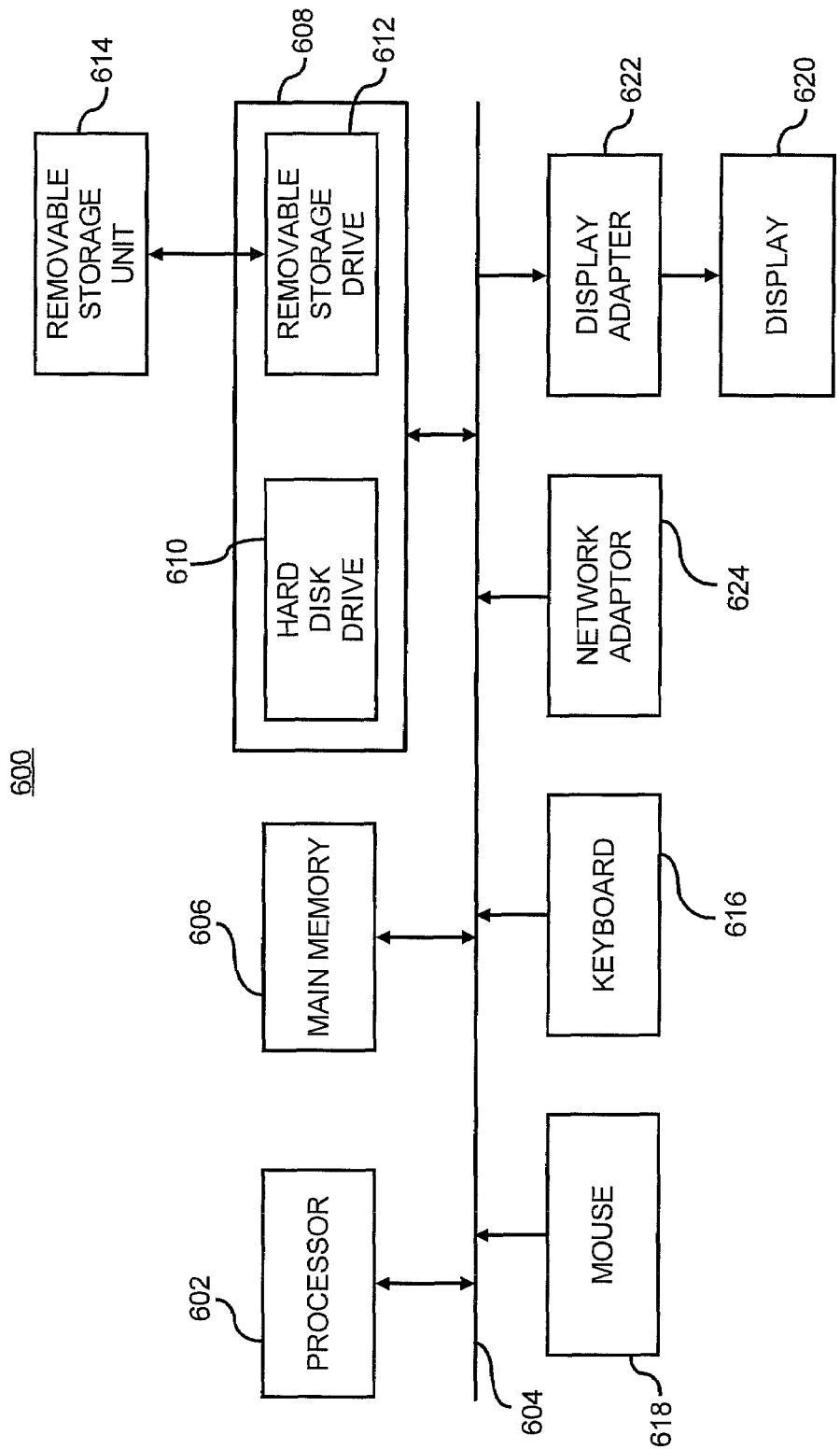
FIG. 6 illustrates a computer system, which may be employed to perform various functions of the controller depicted in FIGS. 1 and 3, according to an embodiment of the invention.

FIG. 6 illustrates a computer system 600, which may be employed to perform the various functions of the controller 114 described herein above with, according to an example. In this respect, the computer system 600 may be used as a platform for executing one or more of the functions described hereinabove with respect to the controller 114.

The computer system 600 includes a processor 602, which may be used to execute some or all of the steps described in the methods 400 and 500. Commands and data from the processor 602 are communicated over a communication bus

604. The computer system 600 also includes a main memory 606, such as a random access memory (RAM), where the program code may be executed during runtime, and a secondary memory 608. The secondary memory 608 includes, for example, one or more hard disk drives 610 and/or a removable storage drive 612, representing a floppy diskette drive, a magnetic tape drive, a compact disk drive, etc., where a copy of the program code for managing fluid flow distribution in an environment may be stored.

The removable storage drive 610 reads from and/or writes to a removable storage unit 614 in a well-known manner. User input and output devices may include a keyboard 616, a mouse 618, and a display 620. A display adaptor 622 may interface with the communication bus 604 and the display 620 and may receive display data from the processor 602 and convert the display data into display commands for the display 620. In addition, the processor 602 may communicate over a network, for instance, the Internet, LAN, etc., through a network adaptor 624.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A vent tile comprising:
    a casing;
    at least one louver positioned within the casing;
    an actuator to control the at least one louver;
    a thermal imaging sensor to capture an infrared image of a surface of a remotely located apparatus to detect a temperature of the surface;
    a controller to determine whether the detected temperature of the surface of the remotely located apparatus is within a predetermined temperature range and to control the actuator to vary the position of the at least one louver in response to the detected temperature of the surface of the remotely located apparatus being outside of the predetermined temperature range to vary the flow of fluid through the casing, wherein the thermal imaging sensor and the controller are housed within the casing; and
    wherein the orientation of the thermal imaging sensor is variable to enable a field of view of the thermal imaging sensor to be modified.

2. The vent tile according to claim 1, wherein the thermal imaging sensor and the controller are attached to the casing.

3. The vent tile according to claim 1, wherein the vent tile is to be placed in an opening of a raised floor of a data center.

4. The vent tile according to claim 1, further comprising:
    an output module to enable the controller to communicate at least one of the detected temperature and a position of the at least one louver to at least one other vent tile controller.

5. The vent tile according to claim 1, further comprising:
    an output module to enable the controller to communicate at least one of the detected temperature and a position of the at least one louver to a central controller to control an air conditioning apparatus that is to supply fluid to the vent tile.

6. The vent tile according to claim 1, wherein a field of view of the thermal imaging sensor comprises a multi-pixel section on the surface of the remotely located apparatus.

7. A vent tile array comprising a plurality of vent tiles according to claim 1, wherein each of the controllers of the plurality of vent tiles is to communicate with at least one other controller of the plurality of vent tiles and wherein the controllers are to control respective actuators based upon information communicated from the at least one other controller.

8. The vent tile array according to claim 7, wherein each of the plurality of controllers communicates by one of a wireless communication and an infrared signal to the at least one other controller.

9. A method for managing fluid flow distribution comprising:
    providing a vent tile having a casing with at least one louver, an actuator to control the at least one louver, a thermal imaging sensor to detect a temperature of a surface of a remotely located apparatus through thermal infrared imaging of the surface, wherein the thermal imaging sensor and the controller are housed within the casing, said method comprising:
    capturing an infrared image of the surface to detect a temperature of the surface of the remotely located apparatus with the thermal imaging sensor;
    determining whether the detected temperature is within a predetermined temperature range in response to a signal by the controller;
    adjusting a position of the at least one louver by the actuator to vary fluid flow through the vent tile in response to the detected temperature being outside of the predetermined temperature range; and
    variably orienting the thermal imaging sensor to modify a field of view of the thermal imaging sensor.

10. The method according to claim 9, wherein determining whether the detected temperature is within a predetermined temperature range further comprises determining whether the detected temperature exceeds an upper bound of the predetermined temperature range, and wherein adjusting the position of the at least one louver further comprises adjusting the position of the at least one louver to increase fluid flow through the vent tile in response to the detected temperature exceeding the upper bound of the predetermined temperature range.

11. The method according to claim 9, wherein determining whether the detected temperature is within a predetermined temperature range further comprises determining whether the detected temperature falls below a lower bound of the predetermined temperature range, and wherein adjusting the position of the at least one louver further comprises adjusting the position of the at least one louver to decrease fluid flow through the vent tile in response to the detected temperature falling below the lower bound of the predetermined temperature range.

12. The method according to claim 9, further comprising:
    communicating at least one of the detected temperature and the position of the at least one louver to a controller of at least one other vent tile.

13. The method according to claim 9, further comprising:
    communicating at least one of the detected temperature and the position of the at least one louver to a central controller configured to control an air conditioning apparatus that is configured to supply fluid to the vent tile.

* * * * *